United States Patent
Da Silva et al.

(10) Patent No.: US 10,996,129 B2
(45) Date of Patent: May 4, 2021

(54) PIPELINE TELEMETRY SYSTEM

(71) Applicant: Quest Automated Services, LLC, Tulsa, OK (US)

(72) Inventors: Hanz Da Silva, Fort Worth, TX (US); Edward Martell, Arlington, TX (US); Adam Cooper, Tulsa, OK (US)

(73) Assignee: Quest Automated Services, LLC, Tulsa, OK (US)

( * ) Notice: Subject to any disclaimer, the term of this patent is extended or adjusted under 35 U.S.C. 154(b) by 270 days.

(21) Appl. No.: 16/125,112

(22) Filed: Sep. 7, 2018

(65) Prior Publication Data

US 2020/0080910 A1  Mar. 12, 2020

(51) Int. Cl.
*G01M 3/00* (2006.01)
*F16L 55/48* (2006.01)
*F16L 55/46* (2006.01)
*G01N 29/30* (2006.01)

(52) U.S. Cl.
CPC ............ *G01M 3/005* (2013.01); *F16L 55/46* (2013.01); *F16L 55/48* (2013.01); *G01N 29/30* (2013.01)

(58) Field of Classification Search
CPC ......... F16L 55/46; F16L 55/48; G01M 3/005; G01N 2291/2636; G01N 29/043; G01N 29/30
See application file for complete search history.

(56) References Cited

U.S. PATENT DOCUMENTS

| | | | |
|---|---|---|---|
| 3,732,434 A * | 5/1973 | French | G01M 3/2823 307/118 |
| 3,882,606 A * | 5/1975 | Kaenel | G01B 7/281 33/544 |
| 3,889,522 A * | 6/1975 | Mayo | G01B 15/02 73/40.5 R |
| 4,435,872 A | 3/1984 | Leikam | |
| 5,884,656 A | 3/1999 | Smith | |
| 6,241,028 B1 | 6/2001 | Bijleveld et al. | |
| 6,475,294 B2 | 11/2002 | McCanna et al. | |
| 7,051,760 B1 | 5/2006 | Beamer et al. | |
| 7,256,576 B2 * | 8/2007 | Mandziuk | F16L 55/40 324/220 |
| 8,296,894 B2 | 10/2012 | Watson et al. | |
| 8,800,584 B2 | 8/2014 | McNabney et al. | |
| 9,662,691 B2 | 5/2017 | Lund | |
| 9,976,686 B2 | 5/2018 | Sander et al. | |
| 2002/0170599 A1 | 11/2002 | Disher et al. | |
| 2016/0245718 A1* | 8/2016 | Chan | G01P 13/02 |
| 2016/0363249 A1 | 12/2016 | Disher | |
| 2018/0045680 A1* | 2/2018 | Thompson | G01N 27/82 |

* cited by examiner

*Primary Examiner* — Francis C Gray
(74) *Attorney, Agent, or Firm* — Hall Estill Attorneys at Law; Tyler Mantooth

(57) ABSTRACT

A telemetry system can be implemented in a pipeline where a smart pig is positioned. The smart pig can have a telemetry module that is configured to change from a first communication connection with a host to a second communication connection with the host in response to a detected pipeline condition. The first communication connection may be different than the second communication connections.

20 Claims, 6 Drawing Sheets

PIPELINE TELEMETRY SYSTEM

SUMMARY

Some embodiments arrange a smart pig in a pipeline. The smart pig has a telemetry module that is configured to change from a first communication connection with a host to a different second communication connection with the host in response to a detected pipeline condition.

In accordance with other embodiments, a smart pig is positioned within a pipeline where a first operational condition of the pipeline is detected with the smart pig. The first operational condition is sent to a remote host via a first communication connection prior to a second operational condition of the pipeline being detected with the smart pig. The smart pig subsequently transmits the second operational condition to the remote host via a second communication connection that differs from the first communication connection.

A pipeline can implement a telemetry system, in various embodiments, by positioning a smart pig within a pipeline and detecting a first operational condition of the pipeline with the smart pig. A telemetry strategy is generated by a telemetry controller of the smart pig prior to sending the first operational condition to a remote host via a first communication connection in accordance with the telemetry strategy. A second operational condition of the pipeline is then detected by the smart pig and the second operational condition is transmitted to the remote host via a second communication connection that differs from the first communication connection in accordance with the telemetry strategy.

DETAILED DESCRIPTION

Continued hydrocarbon exploration has increased the demand for reliable and efficient oil and gas transportation. Hydrocarbon carrying pipeline, conduit, and tube, which can collectively be characterized as pipe, has the potential to provide adequate transportation performance as initially constructed. However, hydrocarbons transportation often degrades pipe over time due at least to the nature of the transported chemicals, the environmental conditions of the pipe, and the presence of debris. As a result, pipe maintenance is needed over time to maintain hydrocarbon transportation performance of a pipe as part of a pipeline.

Pipeline operation is critical to the overall hydrocarbon life cycle from exploration to refining. Hence, taking a pipeline offline to inspect and/or perform maintenance can result in delays and loss of productivity of downstream, and upstream, hydrocarbon processing centers. Accordingly, some pipe inspection equipment can be utilized while fluids flow. In yet, the use of such pipe inspection equipment can pose operational inefficiencies that degrade the overall performance of a pipeline.

With these issues in mind, various embodiments are directed to a pipeline system that utilizes intelligent pig selection and deployment means to send at least one pig through a pipe during fluid transportation within the pipe. The ability to select between multiple different pigging configurations allows a user to provide optimal pipe cleaning and inspection capabilities without delaying, or degrading, the flow of fluids, such as hydrocarbons, through the pipe. The generation of a pigging strategy based on at least one sensed pipeline condition allows a pipeline system to employ maximum inspection and cleaning effectiveness while maintaining pipe transportation performance.

Figure 1:
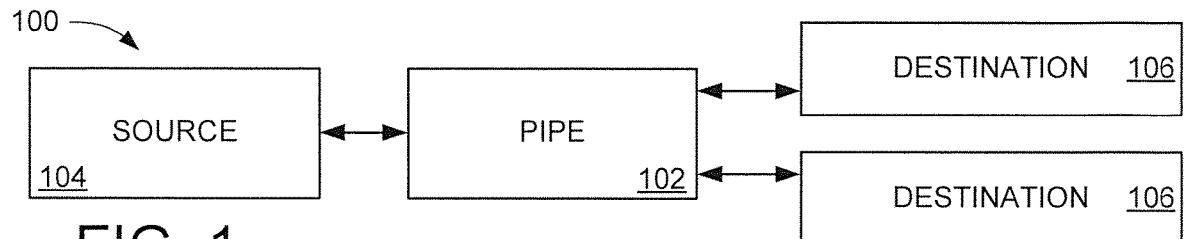
FIG. 1 is a block representation of an example pipeline in which various embodiments may be practiced.

Turning to the drawings, FIG. 1 conveys a block representation of an example pipeline system 100 in which various embodiments may be practiced. A pipe 102 can continuously extend between one or more sources 104 to one or more destinations 106. It is contemplated that the pipe 102 can have one or more mechanical, or electronic, controls, such as valves, filters, pumps, compressors, dryers, and separators, that operate to allow fluids, such as liquids and gases, to travel continuously from a source 104 to a destination 106.

In a non-limiting embodiment, a source 104 is a hydrocarbon exploration site and a destination 106 is a hydrocarbon refining site. Other embodiments may have a source 104 as a pressure generator, such as a pump or compressor, and the destination 106 as a storage unit, such as a tank. It is contemplated that a plurality of separate sources 104 act concurrently, or sequentially, to send fluids to one or more separate destinations 106. Regardless of the number, type, and physical location of the source(s) 104 and destination(s) 106 of a pipeline system 100, the pipe 102 provides a continuous pathway for the fluid to flow. The pipe 102 may be sealed or unsealed with any number of control structure, such as valves and/or gates, that allow the path, pressure, and timing of fluid delivery to at least one destination 106.

Figure 2:
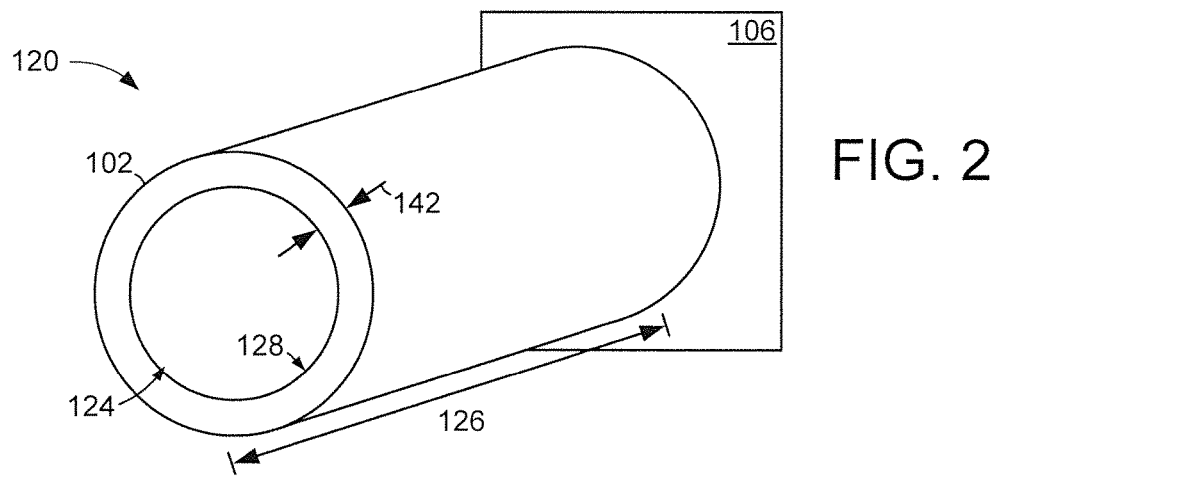
FIG. 2 conveys a cross-sectional line representation of portions of an example pipeline that can be utilized in some embodiments.

FIG. 2 conveys a cross-sectional line representation of portions of an example pipeline 120 that can be utilized in the pipeline system 100 in some embodiments. The pipeline 120 consists of lengths of pipe 102 that are constructed with a uniform wall thickness 122. When the lengths of pipe 102 are connected to link at least one source to at least one destination, as shown in FIG. 1, the interior of the pipe 102 is open and relatively smooth to provide a consistent cross-sectional transport area 124 throughout the length 126 of the pipeline 120.

However, through use and changing environmental conditions over time, the interior transport area 124 can be altered in manners that degrade the fluid transportation performance of the pipeline 120. For instance and in no way limiting, transported fluids can physically alter the interior wall 128 of the pipe 102, which can create pressure differentials that degrade fluid transportation. Fluid being transported in the pipeline 120 can introduce debris that clog, and reduce, the transport area 124 of the pipeline 120 either temporarily when debris moves or long-term when the debris sticks to the interior pipe wall 128. It is noted that debris may be in the form of residual hydrocarbon chemicals, such as sludge, oils, paraffins, or combinations thereof. The blockage, or other alteration of the transport area 124, can be particularly detrimental to fluid transportation performance for the pipeline 120 in the aggregate along the pipeline length 126, such as over miles.

Figure 3:
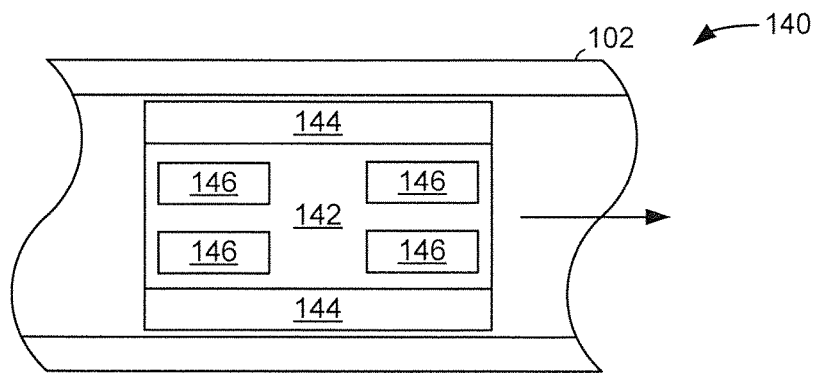
FIG. 3 displays portions of an example pipeline cleaning system that may be employed in the pipeline of FIGS. 1 & 2.

Accordingly, various embodiments engage in pipeline 120 cleaning operations that remove debris and other contaminants from the interior transport area 124. FIG. 3 displays portions of an example pipeline cleaning system 140 that can be utilized to clear portions of a pipeline, such as pipeline 120 of FIG. 2. The cleaning system 140 can physically position one or more slugs 142 into the transport area of a pipe with each slug sized to pass along the length of the pipe 102 under a predetermined pressure. It is contemplated that the slug(s) 142 can move along the pipe 102 with artificial pressure or with the pressure associated with flowing fluids.

The various slug(s) 142 can have physical features 144, such as flanges, cantilevered ridges, and/or brushes, that act on the interior wall of the pipe 102 to clear and/or clean the pipe 102 of debris and contaminants. The use of multiple different slugs 142 allows diverse cleaning capabilities that can efficiently reduce, or eliminate, the presence of contaminations that reduce the fluid transport area of the pipe 102. However, the manual selection, loading, and launching of various slugs 142 into a pipeline can be inefficient, particularly with respect to the fluid volume and pressure conditions within the pipeline. That is, manual time is needed to physically select and position one or more slugs 142 for pipeline insertion and the casual launching of a slug 142 during some fluid transport conditions, such as low pressure and/or volume intervals, can detrimentally impacts fluid transportation performance as well as slug 142 efficiency.

In some embodiments, a slug 142 can be configured with one or more sensors 146 that continuously, or sporadically, detect physical aspects of the pipe 102. For example, sensors 146 can measure pipe wall thickness, pipe joint integrity, and transport area to determine the current fluid transport status of at least a portion of a pipeline. The data from the sensor(s) 146 may additionally indicate what pipeline repairs are needed or what slug(s) 142 are needed to optimize the fluid transportation efficiency of the pipe 102.

Figure 4:
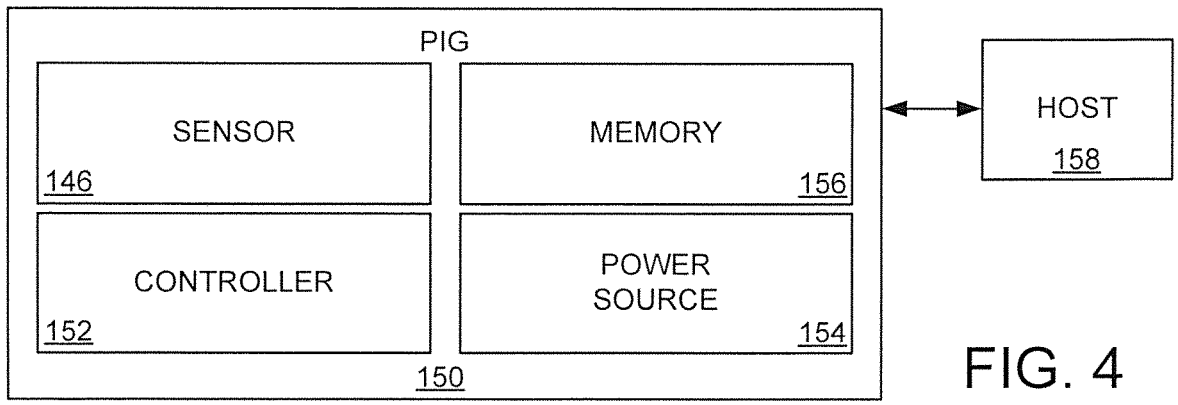
FIG. 4 depicts a block representation of an example slug that can be utilized in the cleaning system of FIG. 3 in accordance with various embodiments.

FIG. 4 depicts a block representation of an example pig 150 that can be utilized in the cleaning system 140 of FIG. 3. The pig 150 has at least one sensor 146 that is connected to a local controller 152, power source 154, and memory 156 to allow data gathering capabilities while the pig 150 travels through a pipeline. Due to the enclosed and metallic configuration of a pipeline, the slug has difficulty transmitting data to a host 158. Thus, collected data is stored locally in the memory 156 and later retrieved by a host when the pig 150 is removed from the pipeline. The difficulty of a pig 150 to connect to a host 158 can result in a pig 150 being lost within a pipeline, which causes fluid transport performance losses as the pig 150 is retrieved.

Figure 5A:
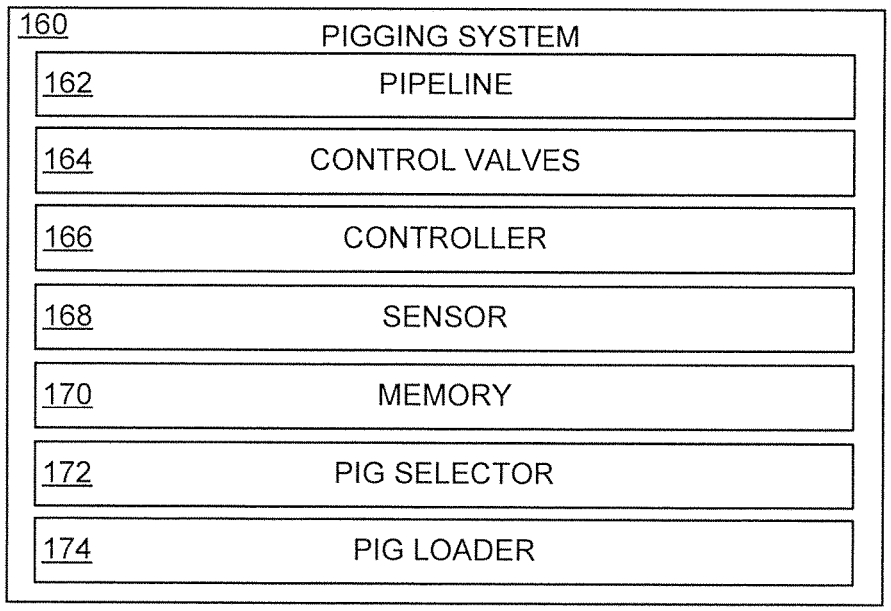
FIGS. 5A & 5B respectively represent portions of an example pigging system operated in accordance with some embodiments.
Figure 5B:
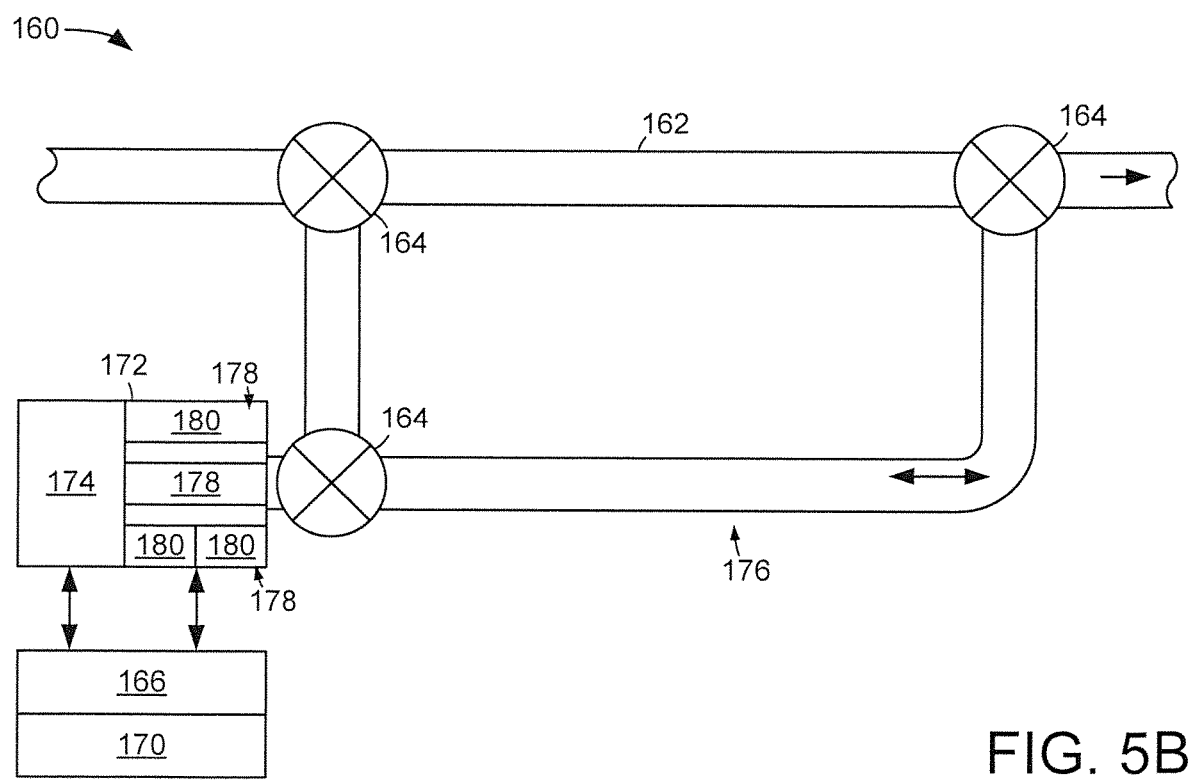

Hence, a pipeline system can be configured, in accordance with some embodiments, with optimized slug selection, distribution, and communication capabilities that increase the maintenance, and inspection, of fluid transporting pipelines. FIGS. 5A and 5B respectively represent portions of an example pigging system 160 that can be employed in a pipeline system to provide optimal sustained operation. The pigging system 160 connects to a pipeline 162 with one or more control valves 164 that provides for manipulation of the flow of fluid within the pipeline 162 to allow the introduction of one or more pigs, which can be similar to the slugs discussed in association with FIGS. 3 & 4, into the pipeline 162.

The pigging system 160 can employ one or more electronic controllers 166, such as a microprocessor or other programmable circuitry, to evaluate the pipeline 162 with at least one sensor 168, generate a pigging strategy stored in local memory 170, and carry out the pigging strategy with a pig selector 172 and a pig loader 174. The system sensors 168 may detect pipeline operation, such as fluid flow rate, volume, or pipe transport area, and environmental conditions, such as ambient temperature, humidity, and pressure, inside and/or outside the pipeline 162. The system controller 166 can utilize the detected operation and/or environmental conditions to determine what pigs are needed to increase fluid transport performance in the pipeline, which can be characterized as a pigging strategy.

The pigging strategy can be executed as directed by the controller 166 by manipulating the pig selector 172 to deliver one or more pigs to the pig loader 174 that physically positions each pig for launching into the pipeline 162. For instance, the pig selector 172 can provide two different types of pigs to the pig loader 174 so that each pig can be received by the control valves 164 and subsequently launched into the pipeline 162 by redirecting fluid flow. FIG. 5B depicts portions of an example pigging system 180 that utilizes the assorted aspects of the system 160 of FIG. 5A.

As shown in FIG. 5B, a pipeline 162 is accessed by a launch piping 176 via control valves 164 that allow pipeline fluid, and pressure, to be diverted to receive a pigging package 178 that consists of one or more pigs 180. The pigging package 178 conforms to a pigging strategy developed by the local controller 166 and is physically constructed by articulating the pig selector 172 relative to the pig loader 174 to move one or more selected pigs 180 into the launch piping 176. It is contemplated that multiple different selectors 172 and/or loaders 174 provide separate access to the launch piping 176 so that a plurality of pigging packages 178 can be concurrently positioned in the launch piping 176. The ability to connect multiple separate pig selectors 172 and loaders 174 to the launch piping 176 allows for efficient supply of different types of pigs 180 as well as optimized loading time for one or more pigging packages 178.

Figure 6:
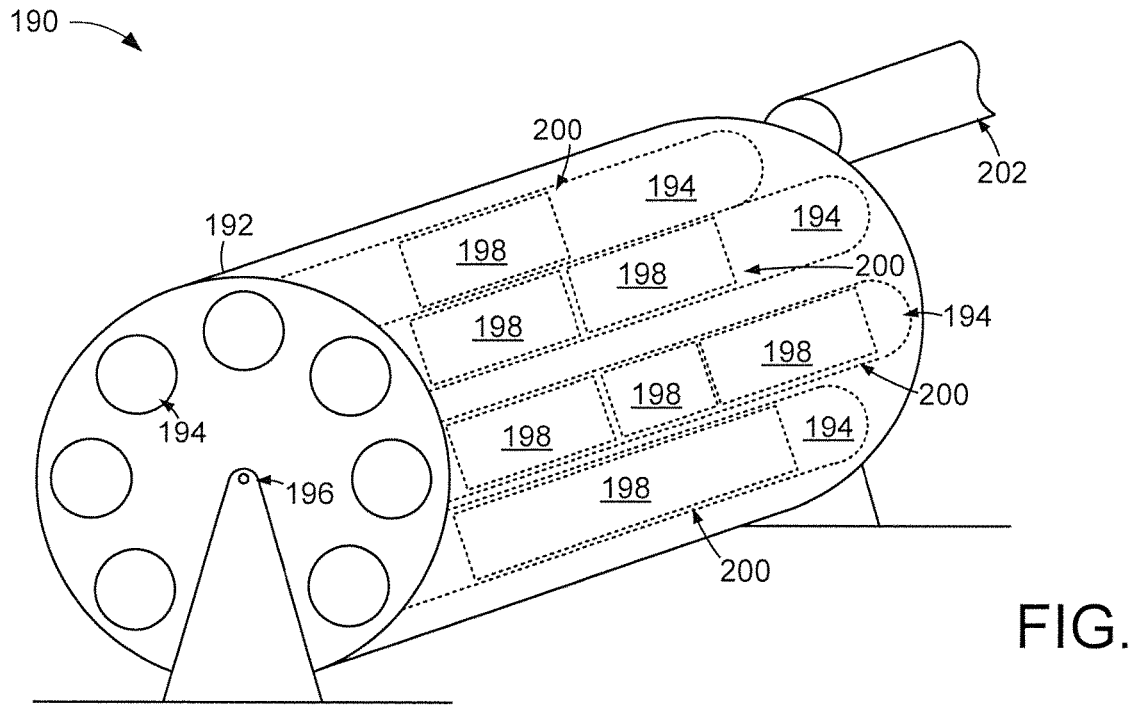
FIG. 6 shows portions of an example pig selector that can be utilized in a pigging system in some embodiments.

An example pig selector 190 is illustrated in FIG. 6, as configured in accordance with various embodiments to be employed in a pigging system. The pig selector 190 comprises a body 192 that can be a single piece of material or an assembly of multiple pieces. The body 192 can be any shape and size that provides multiple different pig chambers 194. In the non-limiting embodiment of FIG. 6, the body 192 has a cylindrical shape with a plurality of physically separate pig chambers 194 positioned about a central axis 196. Each pig chamber 194 continuously extends through the longitudinal extent of the body 192 and is configured to house one or more pigs 198, as shown in segmented lines.

The body 192 can be loaded with pigs 198 from one side by one or more pig loaders and retain the loaded pigs 198 until ejected from the opposite side of the body 192 into the launch piping of a pigging system. The concurrent storage of different pig packages 200 within the various pig chambers 194 allows the single body 192 to provide a diverse array of pigging options for a controller to generate, and execute, a pigging strategy. That is, different types of pigs 198 can be concurrently loaded into the pig chambers to form pig packages 200 that can be selected at will by a local controller to execute a pigging strategy.

By supporting the body 192 via the central axis 196, the body 192 can rotate to position a pig chamber 194 in alignment with launch piping 202 of a pigging system, such as piping 176. Alignment of a pig chamber 194 with launch piping can correspond with articulation of a loader, such as a mechanical arm, introduction of pressure, or other evacuation of the pig package 200 from the pig chamber 194. It is contemplated that the pig selector 190 and pig loader can be automated to provide relatively quick loading of one or more pig packages 200 into launch piping. Such pig package 200 delivery speed can contrast manual loading of individual pigs 198 into launch piping and provide optimized execution of pigging strategy that takes advantage of varying pipeline fluid transportation conditions.

Figure 7:
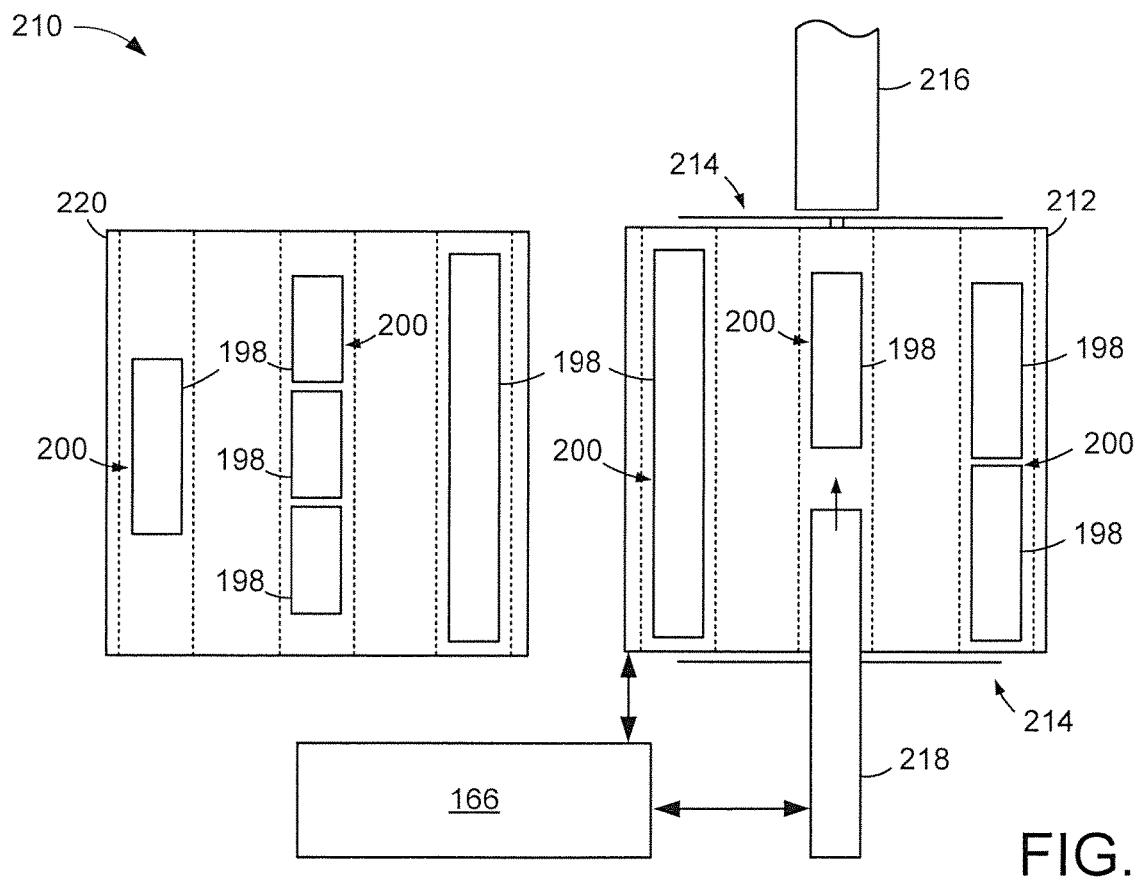
FIG. 7 depicts portions of an example pigging system configured in accordance with assorted embodiments.

While a pig selector body 192 can be loaded with one or more pig packages 200 at any time, some embodiments pre-load a body 192 with several different kinds of pigs 198, such as pigs of different sizes, uses, types, materials, and computing capabilities. The pre-loading of a selector body 192 allows different bodies 192 to be utilized at will. FIG. 7 depicts portions of an example pigging system 210 that employs different selector bodies 212 each pre-loaded with multiple pig packages 200 ready for deployment into a pipeline in accordance with a pigging strategy. As shown, a first pig selector body 212 is mounted on a stand 214 that allows for body rotation and deployment of a single pig package 200 into launch piping 216.

A local controller 166 can execute a pigging strategy by rotating the body 212 and deploying any number of pig packages 200 via articulation of a pig loader 218. At any time, the controller 166 may eject the mounted selector body 212 and load a different second body 220, which may be pre-loaded with pig packages that match, or differ, from the initial configuration of the first selector body 212. It is contemplated that the automated ejection and loading of different selector bodies 212/220 provides long-term pigging operation with minimal human interaction, which can be particularly beneficial in remote physical locations where hydrocarbon pipelines are prevalent. For instance, multiple different selector bodies 212/220 allows an empty body 212 to be replaced automatically without human interaction to seamlessly service one or more different pigging strategies developed by the local controller 166 over time.

It is contemplated that the non-mounted selector bodies 220 can be physically transported to the stand 214 via any mechanical, and/or pneumatic, transport system, such as a ramp, track, pick-and-place, crane, or conveyor. Body 212/220 loading, and ejecting, can be accomplished via gravity, in some embodiments, and/or by mechanical means that selectively move a body 212/220 into, and out of, attachment to a rotating mechanism of the stand 216. In alternative embodiments, a selector body can be a rack holding multiple different pig packages 200 that are mechanically transferred to the launch piping 216 via the pig loader 218 without rotating of the selector body.

Figure 8:
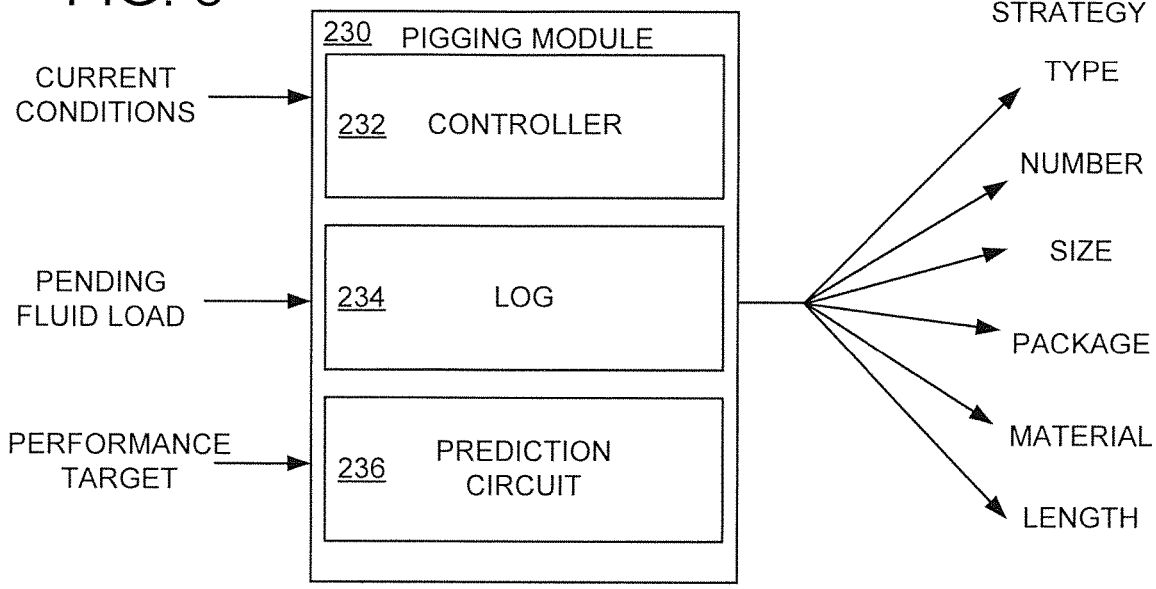
FIG. 8 provides a block representation of a pigging module that can be utilized in a pipeline in accordance with various embodiments.

FIG. 8 conveys a block representation of a pigging module 230 that can be utilized as part of a pipeline system in accordance with various embodiments. The pigging module 230 can be physically located anywhere, but some embodiments position the module 230 proximal a pipeline, such as in physical connection with the pipeline or within 10 feet of the pipeline. The pigging module 230 can employ one or more module controllers 232, which can be any programmable processor, to direct operations from any number of inputs.

In the non-limiting example of FIG. 8, the controller 232 can receive at least the current conditions of a pipeline, the fluid load pending to be transported by the pipeline, and one or more pipeline performance targets. The current conditions of a pipeline can be continuously, or sporadically, detected by one or more sensors connected to the module controller 232. For instance, fluid flow rate, fluid volume, temperature, humidity, viscosity, and pipe thickness may individually, concurrently, or sequentially be detected by different sensors in communication with the pipeline.

The pending fluid load for the pipeline can be sensed in real-time from one or more upstream sources or predicted from current and/or historic data maintained in the log 234 by the module controller 232. The fluid load can comprise the volume and/or pressure of the fluid that is about to be transported through the pipeline. The log 234 may additionally store detected operational, and environmental, conditions of the pipeline that correlate to fluid performance metrics, such as time to destination, average pressure, turbulence, and fluid volume. It is contemplated that the log 234 stores actual, or modeled, fluid performance data from one or more other pipelines as a function of detected operating/environmental conditions. That is, the log 234 can store detected conditions and the corresponding fluid performance for one or more other pipelines in order to make a more accurate prediction of how current pipeline conditions will impact fluid performance.

The data of the log 234 can be utilized alone, or in combination with real-time current detected pipeline conditions, by the prediction circuit 236 to forecast the fluid transportation performance to be expected for the pending fluid load. The prediction circuit 236 can determine if performance targets are likely to be met, perhaps with confidence percentages. The results of the prediction circuit 236, along with the current conditions and pending fluid load, allows the module controller 232 to create an intelligent pigging strategy with a high chance of meeting, or exceeding, the fluid performance targets. Such a derived pigging strategy may involve the type of pig, number of pigs, size of a pig, material of a pig, length of a pig, and how multiple pigs would be packaged (order). The pigging strategy can be carried out as directed by the module controller 232 at any time deemed appropriate to increase the odds that fluid performance targets, such as average pressure, average volume, and time-to-destination, are met or exceeded.

Figure 9:
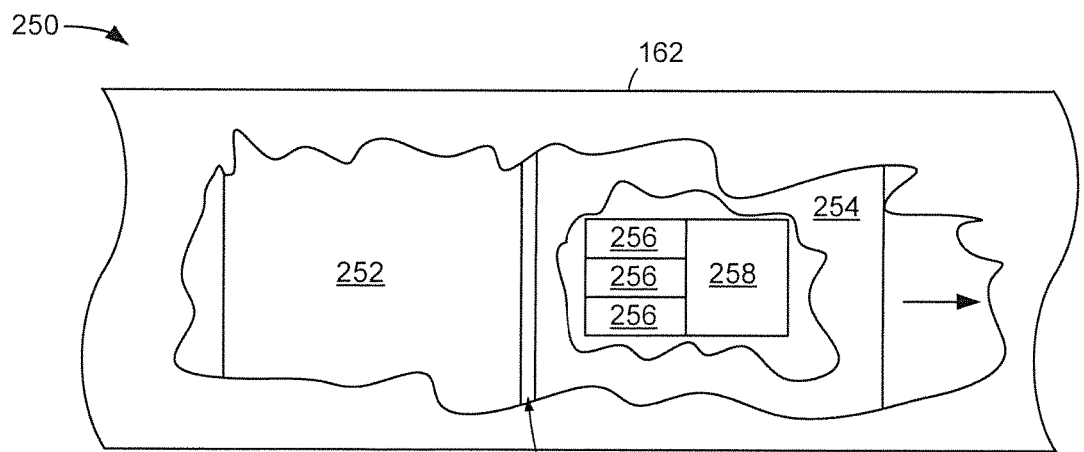
FIG. 9 conveys a line representation of portions of an example pig telemetry system configured and operated in accordance with assorted embodiments.

In the partial cut-away line representation of an example pipeline telemetry system 250 shown in FIG. 9, a pigging package 200 travels through a pipeline 162 in a direction indicated by the solid arrow. The pigging package 200 has a dummy pig 252 and a smart pig 254. The order of the pigs 252/254 can be rearranged at will, as directed by the pigging strategy generated by a pigging module. The dummy pig 252 can be any shape, material, length, and size with any number of physical features that contact the interior sidewall of the pipeline 162. The dummy pig 252 may be solid or hollow and a construction of any number of assembled pieces. For example, the dummy pig 242 may be a single-piece construction or an assembly of various constituent pieces.

The smart pig 254 has at least one computing module that consists of any number of computing components. As shown, the non-limiting computing module consists of a plurality of sensors 256 and a telemetry module 258 configured to reliably broadcast data sensed by the sensors 256 to one or more remote hosts. While it is contemplated that data from the sensors 256 is locally stored, such activity can delay processing of data that can optimize pipeline 162 fluid transportation performance. Hence, the telemetry module 258 can continuously operate to establish and maintain a reliable data pathway to each remote host despite traveling wholly within the pipeline 162. With the telemetry module 258 ensuring data is properly broadcast, the local data storage in the smart pig 254 is less critical and can be minimized, which allows for a more reliable and physically smaller computing module of the smart pig 254.

Figure 10:
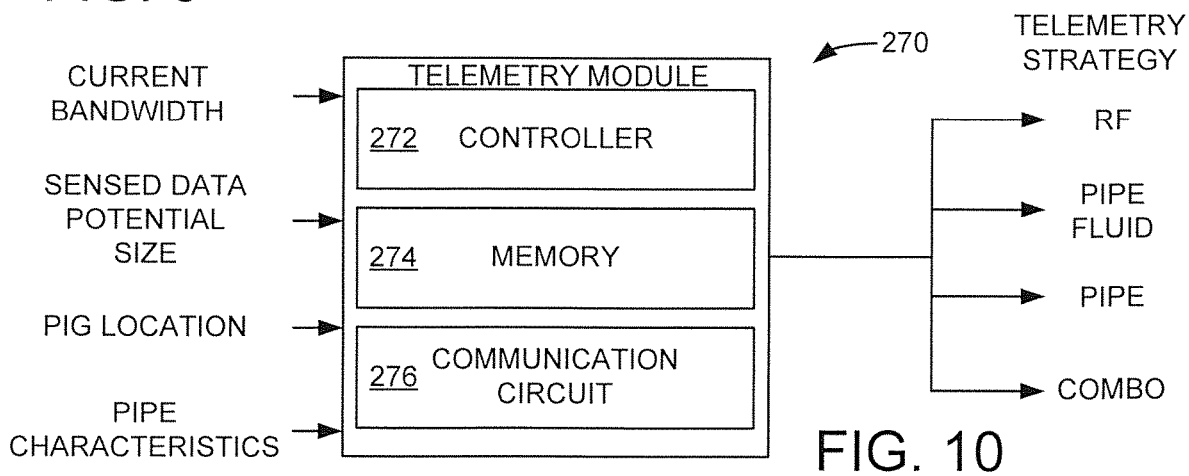
FIG. 10 displays a block representation of an example telemetry module that can be employed in a pipeline in accordance with some embodiments.

FIG. 10 displays a block representation of an example telemetry module 270 that can be used in a smart pig deployed into a pipeline as part of a pigging strategy. One or more telemetry controllers 272, which may be supplemental to the module controller 232 and/or system controller 166, can direct operations of the telemetry module 270. The telemetry controller 272 can input current communications and data transmission conditions, such as, but not limited to, the current communications bandwidth, the potential size of data generated from sensors of a smart pig, the location of the smart pig within a pipeline, and the structural characteristics of the pipe forming the pipeline.

The current bandwidth capability of a communication connection, such as via radio frequency, WiFi frequency, or secured wireless pathway, can be stored in local memory 274 to allow the telemetry controller 272 to evaluate if current, and future, data can be reliably transmitted to one or more connected hosts. Knowing the potential data size from the sensor(s) of a smart pig, along with the current communication bandwidth, allows the telemetry controller 272 to intelligently manage the communication connection from a communication circuit 276. The physical location of a smart pig within a pipeline can also be stored in local memory 274 and provide the telemetry controller 272 with information that indicates which communication connection provides the optimal reliability and/or data transfer speed as the smart pig travels within the pipeline.

While most pipelines have a uniform pipe construction along its length when installed, the flow of fluids over time can alter the pipe's physical characteristics so that the pipe is non-uniform. Identification of the pipe's physical characteristics allows the telemetry controller 272 to select an optimal current, and future, communication connection. For example, the telemetry controller 272 may utilize the pipe material to transmit information while the pipe has conducive physical characteristics and switches to a different communication type in response to the pipe having unfavorable physical characteristics.

In some embodiments, the telemetry controller 272 generates a telemetry strategy that dictates which types of communication connections are used to transmit data from a smart pig to one or more hosts. A telemetry strategy can be based on past operational data stored in the local memory 274, or be reactive to detected operating conditions, such as pipe characteristics and/or distance from a host. For instance, a telemetry strategy can proactively generate a table stored in local memory 274 that correlates sensed operating conditions with different communication types, such as radio frequency (RF), data transmission via the fluid within the pipeline, data transmission via the pipe of the pipeline, or a combination of multiple different communication types. As another non-limiting example, data can redundantly be transmitted by the communication circuit 276 via different communication types until the smart pig is a predetermined distance from a host, or at a predetermined location in the pipeline.

The ability to proactively and reactively adapt a telemetry strategy to real-time pipeline conditions can ensure data generated from the smart pig is optimally transmitted to one or more hosts. Such optimal connection also allows for a host to reliably send signals, and data, to the smart pig, which may involve altering the operation of the smart pig.

Figure 11:
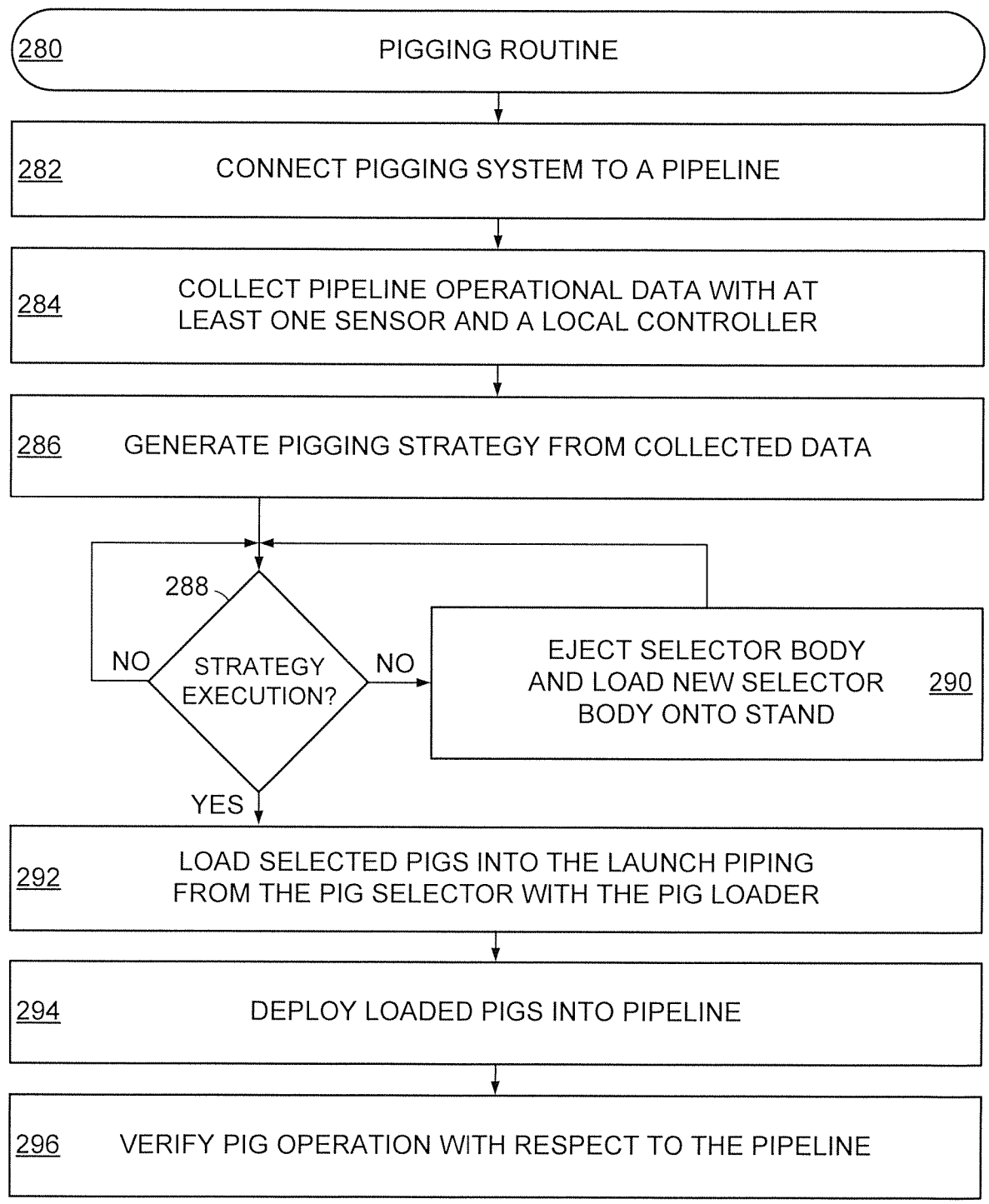
FIG. 11 is a flowchart of an example pigging routine that can be carried out by the various embodiments of FIGS. 1-9.

FIG. 11 is a flowchart of an example pigging routine 280 that can be conducted with the assorted embodiments of FIGS. 2-9 to provide optimized pipeline operation over time. At any time, step 282 connects a pigging system controller to a pipeline, which allows for the collection of pipeline operational data in step 284 via one or more sensors, such as mechanical, environmental, optical, or acoustic sensors. The collection of data in step 284 can be conducted continuously over time, sporadically at scheduled times, or in response to a detected trigger, such as interruption of hydrocarbon flow, pressure threshold being reached, or fluid temperature reaching a threshold. It is contemplated that a smart pig may be launched into the pipeline in step 284 to detect, and/or verify, pipeline operating conditions.

The collected operational data from a pipeline allows the local pigging system controller to generate one or more pigging strategies in step 286 that are directed to establishing, and/or maintaining, optimal pipeline fluid transport performance, such as volume flow, pressure flow, internal pipe turbulence, heat, and transport time. For example, a pigging strategy can be generated to correct a detected issue, such as pressure variations. As another example, a pigging strategy may call for proactive actions that clean, or inspect, portions of a pipeline.

The ability to efficiently select, deploy, and launch one or more pig packages with a pig selector and loader allows the generated pigging strategies to take advantage of relatively short operational intervals, such as high pressure events, high volume events, or hazardous hydrocarbon material transport, to reactively, and/or proactively alter the operating conditions with the constituent pig(s) of the pig packages. That is, different pigs with different shapes, sizes, materials, and weights can be quickly deployed by a rotating pig selector to carry out relatively complex pigging strategies in time to aid, reduce, or prevent future operational conditions, which would be nearly impossible with human selection, loading, and deployment of individual pigs.

A pigging strategy may additionally set pig package launch criteria, such as launch pressure and time to divert pipeline flow via control valves. The combination of pipeline operational conditions and launch conditions in a pigging strategy allows for sophisticated pipeline maintenance that ensures high fluid transport performance over time. The generation of at least one pigging strategy can prompt decision 288 to evaluate if strategy execution is appropriate. If no pigs are available for deployment, decision 288 can execute step 290 that ejects an empty, or insufficient, selector body and subsequently loads an alternate selector body to a stand that allows one or more pigs to be loaded into an adjacent launch piping.

At the conclusion of step 290, or if pipeline operating conditions called for by an active pigging strategy have not been met, decision 288 is revisited. At some point when operating conditions and available pig packages are available in accordance with a pigging strategy, step 292 loads the corresponding pig package(s) into a launch piping to allow step 294 to deploy the loaded package(s) into the pipeline with the launch characteristics (pressure, volume, time) prescribed by the pigging strategy.

It is contemplated that multiple different pigging strategies may be concurrently be evaluated by decision 288. In such a case, decision 288 may overcome conflicts between steps 290 and 292 by prompting the pigging controller to revise a previously generated strategy. For instance, replacement of an empty selector body may be prioritized in decision 288 by a local controller while an existing pigging strategy is amended to account for current pipeline operating conditions. While pig launching conditions may be missed with such strategy revision, accounting for current pipeline operating conditions allows for active pigging strategies to be relevant despite changes in environmental and/or operational conditions.

With the deployment of at least one pig in step 292 in accordance with a pigging strategy, some operational characteristics of a pipeline is at least temporarily altered, such as amount of pipe wall contaminants, operating pressure, operating volume. Step 296 can be conducted at any time after the deployment of a pig in step 292 to verify the completion, and effectiveness, of the execution of the pigging strategy. Such verification can trigger step 286 to be revisited and an active pigging strategy to be amended. Such verification can alternatively be logged by the local system controller to improve future pigging strategies, such as what types of pigs are effective during various hydrocarbon transport conditions. As a result of step 296, future pigging strategies can more effectively optimize pipeline operation.

Figure 12:
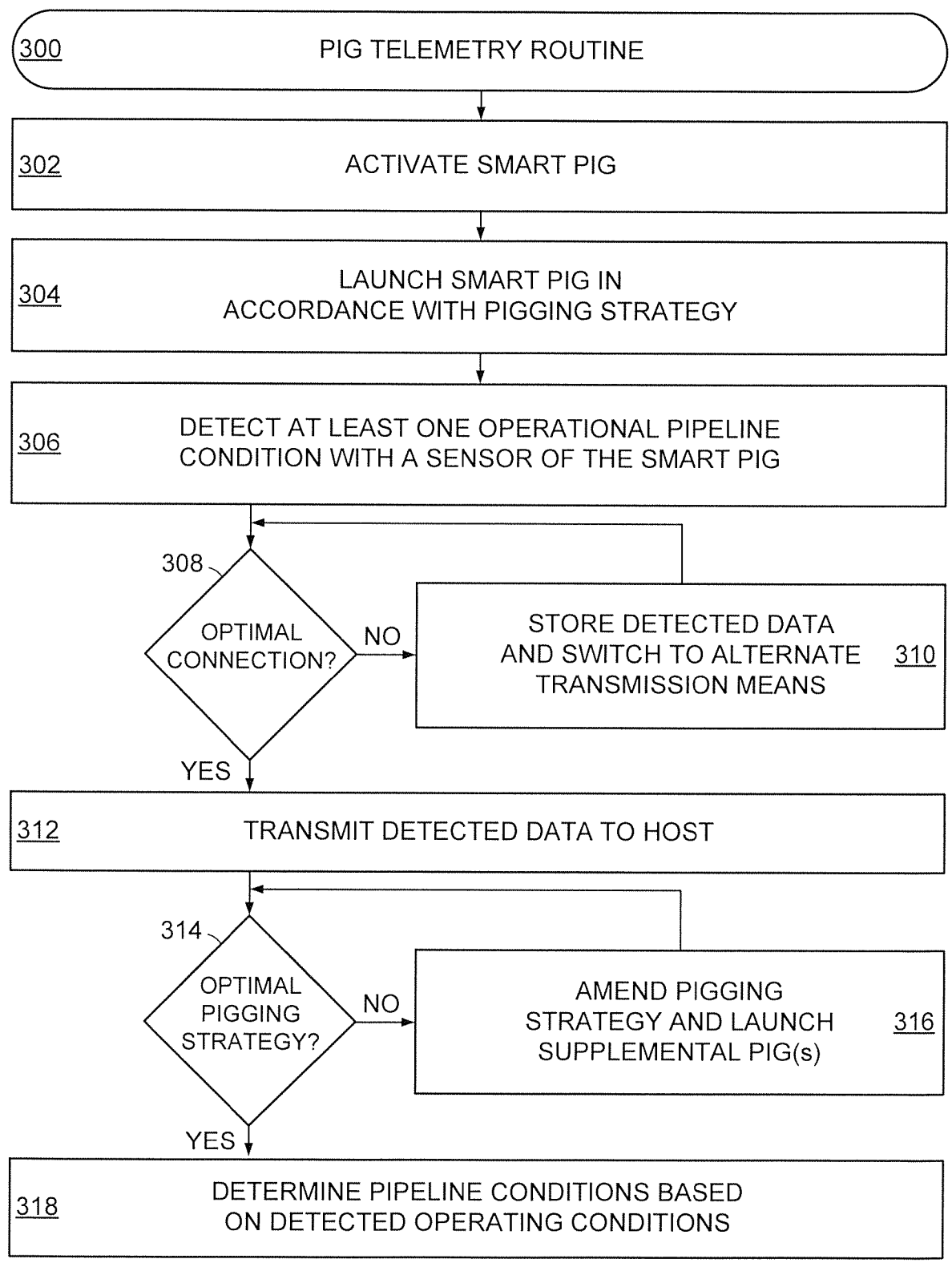
FIG. 12 displays an example pig telemetry routine capable of being executed by the assorted embodiments of FIGS. 1-9.

A pigging strategy can be complemented by a telemetry strategy that establishes, and maintains the best possible communication between a smart pig and at least one host. The pig telemetry routine 300 shown in FIG. 12 conveys a non-limiting example of how a pigging system can be utilized. Initially, at least one smart pig is electronically activated either manually, or electronically, in step 302. The smart pig is then launched into a pipeline in step 304 in accordance with a pigging strategy. It is noted that a smart pig may be launched in a deactivated state and subsequently activated by a host. Activation of the smart pig allows the telemetry module of the smart pig to generate a telemetry strategy that dictates the type of connection(s) to be established over time between the smart pig and each host.

As the smart pig travels through the pipeline, at least one operational pipeline condition is detected in step 306 with a sensor. The operational pipeline condition may be environmental or physical in relation to the fluid, pipeline, or smart pig. The generation of sensed data in step 306 may, or may not, be locally stored in the smart pig prior to being transmitted to a host via the communication type prescribed by the telemetry strategy. However, operational conditions of the smart pig and/or pipeline may deem the predetermined telemetry strategy obsolete. Hence, decision 308 evaluates if the communication connection prescribed by the telemetry strategy remains the optimal connection type.

If a different communication type is determined to be better than the connection provided by the telemetry strategy, step 310 stores the detected data from step 306 and switches to an alternate data transmission means by establishing a different communication connection. It is contemplated that even though a different communication connection is established, the connection may not be optimal. Accordingly, decision 308 is revisited to ensure the best possible communication type, and data transmission quality, is available prior to step 312 transmitting the detected data to at least one host.

The detection of operational pipeline conditions and subsequently optimal data transmission can be cyclically conducted any number of times. At any time, decision 314 can evaluate if the pigging strategy is optimal based on detected operational conditions. For example, detection of unexpected interior pipeline wall contamination can call for one or more additional pigs to be launched. The existence of suboptimal pipeline conditions prompts step 316 to amend the predetermined pigging strategy with the preparation and launching of at least one supplemental pig.

Once the pipeline operations are optimal in relation to what can be corrected with the deployment of one or more pigs, step 318 compiles transmitted smart pig data to determine the current pipeline conditions for flowing fluids. Step 318 can utilize current pipeline conditions to predict future fluid transportation performance. The current pipeline conditions from step 318 can further be used to verify the effectiveness of the pigging strategy, which can be used to improve future pigging strategy parameters. The compilation of data transmitted in real-time allows for quick, and precise, alterations to fluid delivery to a pipeline from an upstream source as well as alterations to the pigging strategy on-the-fly.

Through the various embodiments of a pigging system, pigging telemetry can be optimized in a smart pig that employs a telemetry module. The combination of a telemetry strategy with a pigging strategy can maintain high fluid transport performance and pigging data processing despite changing pipeline and/or environmental conditions. The ability to adapt the manner in which a smart pig communicates with one or more hosts while the smart pig travels through a pipeline allows for quick and reliable pipeline information to be obtained and processed, which allows for corrective actions, such as adapting a pigging strategy, to be performed to maintain fluid transport performance metrics.

What is claimed is:

1. An apparatus comprising a smart pig positioned within a pipeline, the smart pig comprising a telemetry module configured to change from a first communication connection with a host to a second communication connection with the host in response to a detected pipeline condition, the first and second communication connections being different.

2. The apparatus of claim 1, wherein the telemetry module comprises a telemetry controller.

3. The apparatus of claim 1, wherein the telemetry module comprises a memory and a communication circuit.

4. The apparatus of claim 1, wherein the telemetry module is connected to a first sensor and a second sensor each housed in the smart pig.

5. The apparatus of claim 4, wherein the first sensor and second sensors being different and respectively configured to detect different operational conditions.

6. The apparatus of claim 1, wherein the first communication connection transmits data via a radio frequency and the second communication connection transmits data via a fluid present within the pipeline.

7. The apparatus of claim 1, wherein the second communication connection transmits data via a pipe of the pipeline.

8. A method comprising:
    positioning a smart pig within a pipeline;

detecting a first operational condition of the pipeline with the smart pig;

sending the first operational condition to a remote host via a first communication connection;

detecting a second operational condition of the pipeline with the smart pig; and transmitting the second operational condition to the remote host via a second communication connection, the first and second communication connections being different.

9. The method of claim 8, wherein the smart pig was launched into the pipeline in accordance with a pigging strategy.

10. The method of claim 8, wherein the second communication connection is established in response to a detected pipeline condition.

11. The method of claim 8, wherein the first and second communication connections transmit data concurrently.

12. The method of claim 8, wherein the first communication connection is terminated once the second communication connection is established.

13. The method of claim 8, wherein the first and second communication connections each transmit the same data to the remote host.

14. The method of claim 8, wherein the second communication condition is established in response to a module controller of the smart pig detecting a predetermined physical distance between the smart pig and the remote host.

15. A method comprising:
positioning a smart pig within a pipeline;
detecting a first operational condition of the pipeline with the smart pig;
generate a telemetry strategy with a telemetry controller of the smart pig;

sending the first operational condition to a remote host via a first communication connection in accordance with the telemetry strategy;

detecting a second operational condition of the pipeline with the smart pig; and transmitting the second operational condition to the remote host via a second communication connection in accordance with the telemetry strategy, the first and second communication connections being different.

16. The method of claim 15, wherein the second operational condition is stored in a local memory of the smart pig prior to being transmitted to the remote host.

17. The method of claim 15, wherein the telemetry strategy is generated after the smart pig is launched into the pipeline.

18. The method of claim 15, wherein the telemetry strategy is altered by the telemetry controller in response to the first communication connection being less optimal than the second communication connection.

19. The method of claim 15, wherein the telemetry controller switches to a third communication connection prior to transmitting the second operational condition via the second communication connection, the telemetry controller subsequently establishing the second communication connection after determining the third communication connection is less reliable than the second communication connection.

20. The method of claim 15, wherein the telemetry strategy dictates redundant transmission of the second operational condition by the first and second communication connections.

* * * * *